(12) United States Patent
Apblett et al.

(10) Patent No.: US 10,365,075 B2
(45) Date of Patent: Jul. 30, 2019

(54) EXPLOSIVE-CONTAINING POROUS MATERIALS AS NON-DETONABLE TRAINING AID

(71) Applicant: Xplosafe, LLC, Stillwater, OK (US)

(72) Inventors: Allen W. Apblett, Stillwater, OK (US); Nicholas F. Materer, Stillwater, OK (US); Shoaib Shaikh, Stillwater, OK (US)

(73) Assignee: XploSafe, LLC, Stillwater, OK (US)

( * ) Notice: Subject to any disclaimer, the term of this patent is extended or adjusted under 35 U.S.C. 154(b) by 693 days.

(21) Appl. No.: 15/137,055

(22) Filed: Apr. 25, 2016

(65) Prior Publication Data

US 2019/0186878 A1    Jun. 20, 2019

Related U.S. Application Data

(60) Provisional application No. 62/152,439, filed on Apr. 24, 2015.

(51) Int. Cl.
| | |
|---|---|
| *D03D 23/00* | (2006.01) |
| *F42B 8/28* | (2006.01) |
| *A01K 29/00* | (2006.01) |
| *A01K 15/02* | (2006.01) |
| *C06B 45/00* | (2006.01) |
| *C06B 45/12* | (2006.01) |
| *D03D 43/00* | (2006.01) |

(52) U.S. Cl.
CPC ............... *F42B 8/28* (2013.01); *A01K 15/02* (2013.01); *A01K 29/00* (2013.01)

(58) Field of Classification Search
USPC ............ 149/2, 14, 108.4, 108.8, 109.4
See application file for complete search history.

(56) References Cited

U.S. PATENT DOCUMENTS

| 7,295,308 B1 | 11/2007 | Samuels et al. |
| 7,932,089 B2 * | 4/2011 | Cohen-Arazi ......... A01K 15/02 |
| | | 102/355 |
| 7,955,574 B2 | 6/2011 | Fryxell et al. |
| 8,011,224 B2 | 9/2011 | Kendler et al. |
| 8,067,110 B2 | 11/2011 | Rakow |

(Continued)

OTHER PUBLICATIONS

R.C. Phillips ("Training dogs for explosives detection" in U.S. Army and Land Warfare Laboratory,Technical Memorandum LWL-CR-01B70 (1971), 1-52).
Apblett et al. ("Synthesis of mesoporous silica grafted with 3-glycidylpropyltrimethoxy-silane" in Mater. Let. (2009), 63(27), 2331-2334).

(Continued)

*Primary Examiner* — James E McDonough
(74) *Attorney, Agent, or Firm* — Innovar, L.L.C.; Rick Matos

(57) ABSTRACT

A training aid for use in training canines to detect an explosive material includes an explosive material adsorbed in the pores of a high surface area mesoporous or nanoporous host material. By adjusting the surfaces of the pores of the substrate material, the substrate can accommodate various types of explosive materials in a non-detonable and non-flammable manner, including nitroaromatics, nitroamines, nitrate-based explosives, and peroxide-based explosives. When the training aid is in an unsealed condition, a continuous flux of explosive material is released without providing any explosive or flame hazard to the trainer and canine.

20 Claims, 3 Drawing Sheets

(56) References Cited

U.S. PATENT DOCUMENTS

| | | | |
|---|---|---|---|
| 8,114,230 B1* | 2/2012 | Basom | C06B 23/00 |
| | | | 149/109.4 |
| 8,500,852 B2 | 8/2013 | Galbraith | |
| 8,561,484 B2 | 10/2013 | Tipler et al. | |
| 8,563,316 B2* | 10/2013 | Duffy | F41H 11/134 |
| | | | 102/355 |
| 8,668,873 B2 | 3/2014 | Almirall et al. | |
| 8,955,515 B2 | 2/2015 | Rakow et al. | |
| 9,079,049 B2 | 7/2015 | Tobias et al. | |
| 9,249,241 B2 | 2/2016 | Dai et al. | |
| 9,329,278 B2 | 5/2016 | Yoder | |
| 9,370,749 B2 | 6/2016 | Addleman et al. | |
| 9,412,573 B2 | 8/2016 | Almirall et al. | |
| 9,643,186 B1 | 5/2017 | Ahmad et al. | |
| 9,783,417 B2 | 10/2017 | Chandran et al. | |
| 9,901,843 B2 | 2/2018 | Todosiev et al. | |
| 9,914,087 B2 | 3/2018 | Marotta et al. | |
| 2007/0221087 A1* | 9/2007 | Adebimpe | A01K 15/02 |
| | | | 102/355 |
| 2009/0199936 A1* | 8/2009 | Hagit | A01K 15/02 |
| | | | 149/33 |

OTHER PUBLICATIONS

Apblett et al. ("Preparation of mesoporous silica with grafted chelating agents for uptake of metal ions" in Chemical Engineering Journal (2009), 155(3), 916-924).

Apblett et al. ("Metal ion adsorption using polyamine-functionalized mesoporous materials prepared from bromopropyl-functionalized mesoporous silica" in Journal of Hazardous Materials (2010), 182,581-590).

Apblett et al. ("3-Aminopropyltrimethoxysilane functionalized mesoporous materials and uptake of metal Ions" in Asian J. Chem. (2011), 23(2), 541-546).

Tuel et al. ("Synthesis and Characterization of trivalent metal containing mesoporous silicas obtained by a neutral templating route" in Chem. Mater. (1996), 8, 114).

Sigma Aldrich Catalog ("MCM-41, pellet", Item No. 900773; https://www.sigmaaldrich.com/united-states.html; (2018)).

Al-Othman et al. ("Synthesis and characterization of a hexagonal mesoporous silica with enhanced thermal and hydrothermal stabilities", in Applied Surface Science (2010), 256, 3573-3580).

Zhu et al. ("High-performance humidity sensors based on quartz crystal micro-balance coated with mesoporous silica MCM-41 thin film" in Materials Technology (2017), 32, 101-104).

* cited by examiner

EXPLOSIVE-CONTAINING POROUS MATERIALS AS NON-DETONABLE TRAINING AID

CROSS-REFERENCE TO PENDING APPLICATIONS

This application claims priority to U.S. Prov. Pat. Appl. Ser. No. 62/152,439, filed Apr. 24, 2015.

BACKGROUND OF THE INVENTION

This invention relates generally to systems, apparatuses, compositions, and methods used to generate pure explosive vapor sources that are non-detonable. More specifically, the invention relates to systems, apparatuses, compositions, and methods used for training canines to detect explosives.

Canines trained to detect explosives provide a first line of defense at airports, postal facilities and military installations, and help protect police, fire, military and civilian personnel from explosive threats. Typically, canines are trained to detect standard explosives (seven traditional types including 2,4,6-trinitrotoluene (TNT), and hexahydro-1,3,5-trinitro-1,3,5 triazine (RDX) in addition to improvised primary explosives (e.g., peroxide based, chlorate). Currently, best practices dictate that the canines are trained using actual explosives, and that this training occurs on a continuous basis.

Because the utilization of actual explosives requires trained personnel who are qualified in handling explosive materials, the canine training is both manpower-intensive and costly. The expense is further exacerbated by the need to handle and dispose of the explosive material according to local, state, and federal explosives regulations. Furthermore, the training aids, whether real or a surrogate, are expensive and not readily available for many potential explosive threats such as hexamethylene triperoxide diamine (HMTD). Additionally, the use of real explosives creates an inherent risk of injury to the canine and its handler.

Working with the explosives in the pure form is extremely risky. The risk of injury is especially problematic for peroxide-based improvised explosives such as HMTD and triacetone triperoxide (TATP) that are extremely sensitive to mechanical and environmental shocks. HMTD can even react with many common metals in a process that can lead to detonation.

Therefore, a need exists for a canine training aid which generates vapor of the pure explosive without the risk of detonation.

SUMMARY OF THE INVENTION

A canine training aid made according to this invention utilizes mesoporous silica or a ceramic metal oxide (such as but not limited to aluminum oxide) material as a framework or substrate in which an explosive material is housed. The mesoporous substrate may have pores in a range of 2 nm to 15 nm. The substrate houses the explosive material in its pores and inhibits explosive hazards while ensuring the maintenance of a detectable vapor pressure of the explosive. Because the training aid exhibits high surface area due to the adsorption of the explosive within the pores of the substrate, it provides enhanced vapor pressure over the pure explosive material and a smaller quantity of the explosive can be used to simulate a much larger quantity of the bulk explosive material.

Because the mesoporous substrate is a non-volatile inorganic oxide (silica), there are no extraneous vapor phase odorants that could interfere with training of explosive-sensing dogs. The substrate can easily accommodate a commercial explosive (dynamite), several military explosives (e.g., TNT, RDX and PETN), and improvised (home-made) primary explosives used by terrorists (e.g., HMTD, TATP). As a specific but non-limiting example, the detailed description section below describes HTMD as the explosive material housed within the pores of a mesoporous silica substrate.

Objectives of this invention include, but are not limited to, providing a canine training aid that: (1) employs extremely low amounts of explosive material, negating safety hazards inherent in the use of explosives; (2) utilizes surface adsorption within the pores to permit use of a small amount of the explosive material to simulate the vapor produced from a much larger amount; (3) reduces the costs associated with training personnel for handling actual explosives, and (4) eliminates the need for the special storage, handling and disposal requirements associated with sufficient amounts of bulk explosives.

DETAILED DESCRIPTION OF THE PREFERRED EMBODIMENTS

Figure 1:
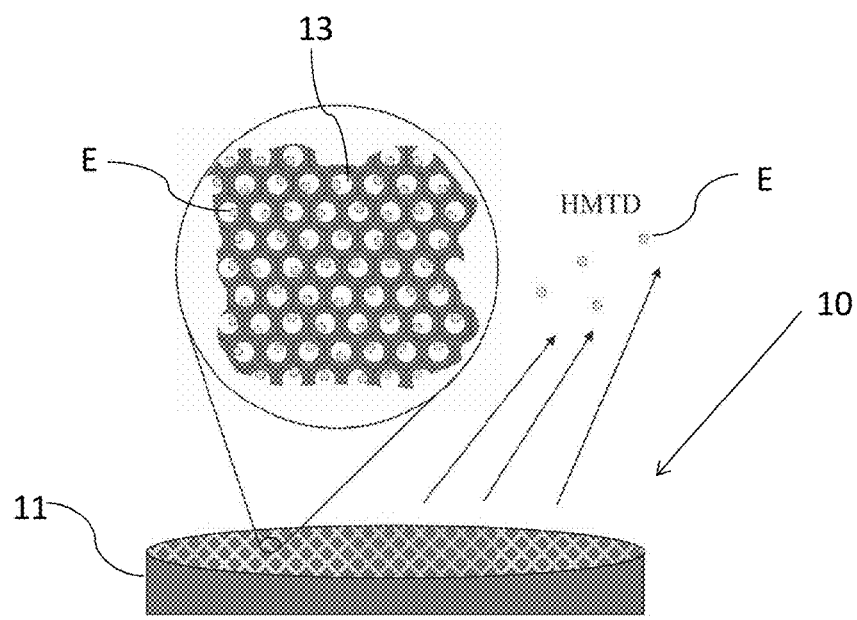
FIG. 1 is a graphical depiction of a preferred embodiment of a non-detonable, non-hazardous training aid for hexamethylene triperoxide diamine ("HMTD") showing the protective mesoporous substrate and the release of HMTD from the pores of that substrate.

A preferred embodiment of a non-detonable explosive vapor source or canine training aid made according to this invention makes use of extremely small quantities of the pure explosive material but is non-detonable and non-hazardous. The explosive material may be an explosive material selected from the following general classes of explosives:

nitroaromatics—e.g., 2,4,6-trinitrotoluene (TNT), dinitrotoluene (DNT), 1,3,5-trinitrobenzene nitroamines—e.g., hexahydro-1,3,5-trinitro-1,3,5 triazine (research department explosive or RDX or cyclonite); octahydro-1,3,5,7-tetranitro-1,3,5,7 tetrazocine (high melting explosive or HMX), nitroguanidine, and tetryl;

nitrate-based explosives—e.g., pentaerythritol tetranitrate (PETN), urea nitrate, ammonium nitrate; and peroxide-based explosives—e.g., hexamethylene triperoxide diamine (HMTD), triacetone triperoxide (TATP). When in use, the canine training aid releases a continuous flux of explosive, simulating the pure explosive.

The training aid includes an inorganic mesoporous non-volatile substrate that houses explosive material in its pores, inhibits explosive hazards, and ensures the maintenance of detectable vapor pressure of the explosive. The inorganic mesoporous non-volatile substrate can be silica or a ceramic metal oxide with pores in a range of 2 nm to 15 nm. The substrate can be in powder form or pressed into circular discs (pellets) or beads ranging in size from 6 mm to 15 mm in diameter and 1 mm to 3 mm in thickness.

In either powder or pelletized form, the substrate can easily accommodate commercial explosive (dynamite), several military explosives (e.g., TNT, RDX and PETN), and improvised (homemade) primary explosives used by terrorists (e.g., HMTD, and TATP). The substrate can be loaded with over 25% in mass of the explosives within the bulk of the pores of the substrate. Blank pellets with no explosive loading can be used as a control or distractor vapor source.

The resulting training aid exhibits high vapor pressure due to the adsorbed explosive within the pores of the substrate. Therefore, a smaller quantity of the explosive can be used to simulate a much larger quantity of the bulk explosive material. The training aid releases a sufficient flux of explosive to mimic the bulk explosive for more than a reasonable testing period. For example, in a preferred embodiment the training aid mimics the bulk explosive for at least 4 hours of continuous use.

The training aid can be used to imprint explosive detection canines on explosive odors; train explosive detection canines to detect explosive odors; evaluate explosive detection canines in accurately detecting explosive vapors; and evaluate explosive detection canines trained on live explosive odors. The training aid can also be used as a reference explosive vapor source to calibrate explosive detection sensors and devices; test detection limits of explosive detection sensors and devices; test the accuracy of explosive detection sensors and devices; and evaluate the effectiveness in detection of explosive vapors by explosive detection sensors and devices.

The training aid loaded with up to 25% by mass of the explosive is non-detonable when exposed to temperatures exceeding the thermal decomposition temperature for a given explosive and is non-detonable to impact force, friction, or flame. The OSU-6 mesoporous silica substrate used in the training aid does not react to produce decomposition products and the loaded training aid mimics the bulk explosive for a considerable time period. Therefore, the training aid does not require storage in an explosive magazine or the like as a hazardous or dangerous material. Any residual explosives inside the training aid can be neutralized by soaking the training aid for at least 24 hours in an aqueous solution containing a proprietary reagent manufactured by XploSafe, LLC (Stillwater, Okla.).

Referring to FIG. 1, a preferred embodiment of training aid 10 includes a protective mesoporous framework or substrate 11 (the mesoporous substrate) which houses or adsorbs an explosive material E in its pores 13. The mesoporous substrate 11 may be a silica or ceramic metal oxide substrate or an equivalent to these. The nanopores 13 contain the molecules of the explosive material E such that neither heat, friction, impact, nor a flame applied to the training aid 10 can cause the explosive material E to detonate.

When in use, the explosive material E is released from the pores to produce a sufficient flux of explosive vapor to mimic that of the bulk (second greater detonable amount) explosive. Due to adsorption within the pores 13, the first amount of explosive material E has a high surface area compared to the bulk explosive being simulated, and a much smaller quantity of explosive material E can be used in place of a much larger quantity of the bulk explosive material.

Figure 2:
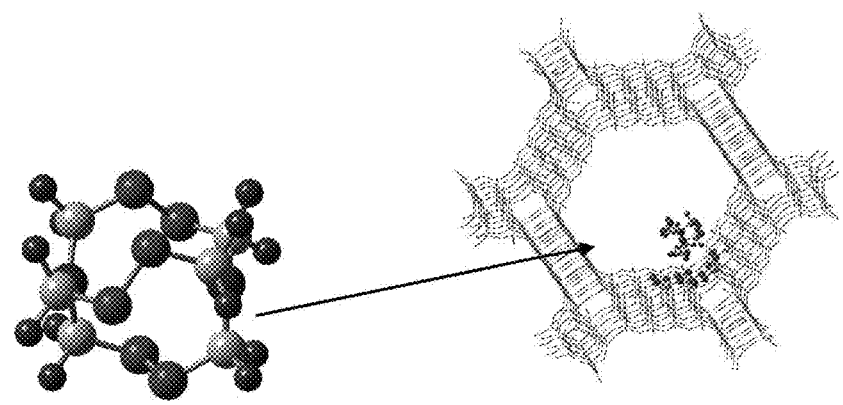
FIG. 2 is a carbon drawing of a single HMTD molecule adsorbed inside MCM-41 (hexagonal mobile crystalline material) pore. Red is oxygen, blue is nitrogen, gray is carbon and black is hydrogen.

For the purpose of describing the preferred embodiments, and by way of example only, the explosive material E is HMTD, and the mesoporous substrate 11 is mesoporous silica. HMTD can be safely adsorbed within the pores 13 of the mesoporous substrate 11 (see e.g. FIG. 2), thereby separating the HMTD molecules and protecting them against friction and impact. The HMTD hosted within the pores 13 can be released at a sufficient rate to simulate a large and dangerous amount of actual material.

Mass Spectrometry Characterization

Figure 3:
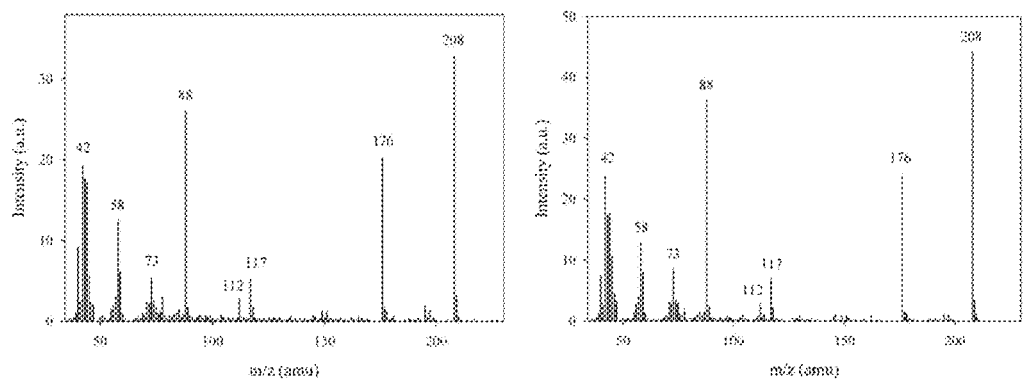
FIG. 3 is a mass spectrum (left) of vapor from pure HMTD and (right) HMTD-loaded OSU-6 (MCM-41 type) mesoporous silica sample.

The mass spectrum of pure HMTD is shown in the left pane of FIG. 3, generated using an HP5989 mass spectrometer and a direct injection probe. This instrument allows direct flux measurements from low vapor pressure explosives such as TNT and RDX. Electron impact of 70 eV was used for ionization. There were no masses present above the parent ion (up to 500 amu) and the spectrum agrees favorably with those published in the scientific literature (Jimmie Oxley, Jun Zhang, and James Smith, Mass Spectra of Unlabeled and Isotopically Labeled Hexamethylene Triperoxide Diamine (HMTD). *Propellants Explosives, Pyrotechics* 2000, 25(6), 284-87). Thermal decomposition products of HMTD include N,N dimethyl amino methane (m/z=75, 57 and 45), tertiary amines (m/z=87, 75, 74, 58 and 46), hexamethylene tetraamine (m/z=140, 85 and 42) and aliphatic amines (m/z=78, 73, 59 and 45). None of these substances were detected by mass spectrometry, indicating the absence of HMTD decomposition.

The right side of FIG. 3 shows a typical mass spectrum obtained after loading mesoporous silica with HMTD content between 10 and 25% by weight. The amount of the HMTD-impregnated in the mesoporous silica can be adjusted to control the overall flux and lifetime of the training aid.

Figure 4:
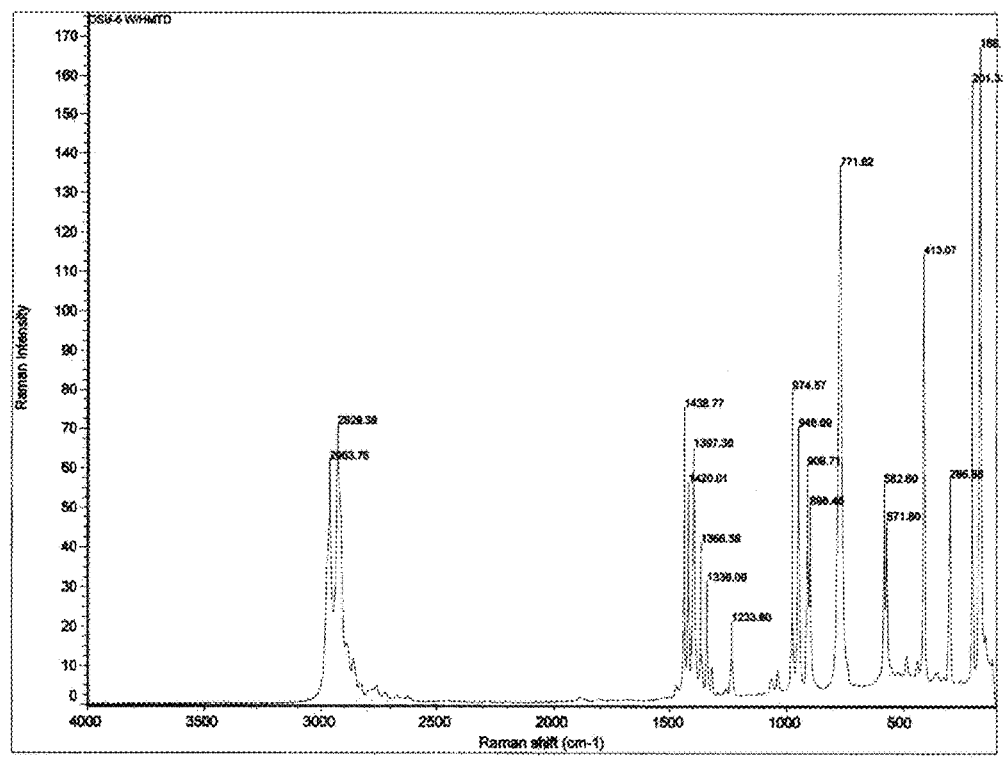
FIG. 4 is a Raman spectrum of HMTD-loaded OSU-6 mesoporous silica.

The identity of the material deposited in the mesoporous silica was also checked by Raman spectroscopy. FIG. 4 shows a typical Raman spectrum of HMTD-containing mesoporous silica. The spectrum matched that typically reported for HMTD in the literature.

Non-Explosive Properties of the HMTD Training Aid

Figure 5:
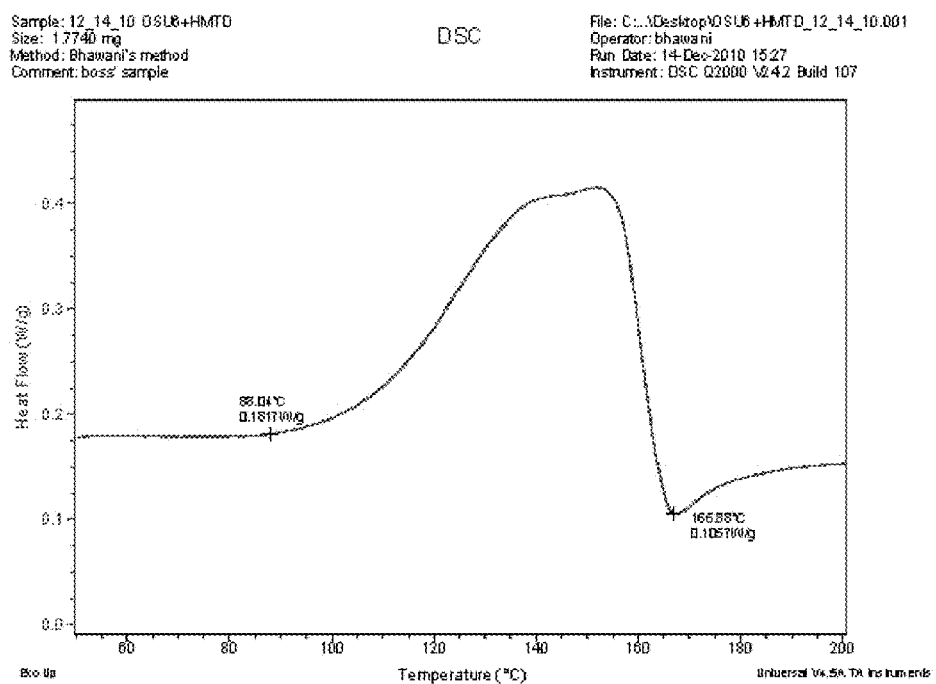
FIG. 5 is a differential scanning calorimetry trace for OSU-6 mesoporous silica loaded with 20% HMTD by weight.
Figure 6A:
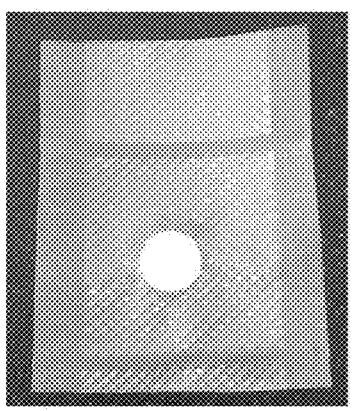
FIG. 6A is a photograph showing an explosive loaded training aid vacuum-sealed in the ultrapure primary container.
Figure 6B:
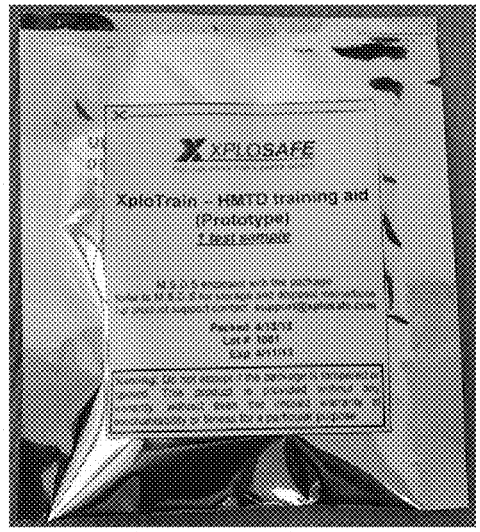
FIG. 6B is a photograph of the vacuum-sealed pellet of FIG. 6A inside a secondary bag, which has an aluminum lining for moisture and static protection.

Differential scanning calorimetry (DSC) was used to ensure that the nano-confined explosives do not display explosive properties. Using DSC, the material can be classified as self-heating, explosive, or detonable. The training aid displayed a smooth decomposition and exhibited a broad exothermic peak typical of a non-explosive material. The exothermic peak tended to extend from 85° C. to 170° C. with a slight endothermic step at the higher temperature side, presumably due to evaporation of decomposition products. This peak is in contrast to a sharp spike indicative of explosive decomposition. All training aids with loading up to 25% by weight exhibited a smooth, wide exothermic peak corresponding to the decomposition of the HMTD (see FIG. 5).

An explosive impact tester designed and built by XploSafe, LLC (Stillwater, Okla.) was calibrated with pure HMTD and PETN to quantify the effect of impact. For the HMTD training aids with loading less than 50% by weight, no detonation was observed at impacts greater than that required for detonation of PETN. Thus, the HMTD training aids are significantly less impact sensitive than PETN. In addition, these materials do not detonate even in an uncontrolled hammer test.

Friction sensitivity of the samples was measured using the German Bundesanstalt für Materialprufing (BAM) method. HMTD and PETN explosives were used to calibrate the tester. This test simulates the potential initiation of explosive that may be caught in mechanical parts, which could apply a pinch or sliding load on the explosive. The application of friction could not detonate HMTD-containing mesoporous silica with HMTD loadings less than 50% by weight, indicating friction sensitivity significantly less than PETN.

Disposal of the Training Aid

Although the training aid is non-detonable by impact, friction, heat, or flame, an option can be provided for its safe disposal after use, but before all traces of the explosive are exhausted. Depending on the explosive material E used, different materials could be provided to neutralize the residual explosive. In some embodiments, a proprietary reagent powder manufactured by XploSafe, LLC (Stillwater, Okla.) can be provided for neutralization of any residual explosive. As an example, the reagent powder can be dissolved in water and used in a bath to soak the training aid 10, eliminating any trace of the impregnated explosive. After soaking, the solution and training aid could be safely discarded. The spent aid 10 contains only environmental benign materials and no organic solvents or heavy metals, even with respect to the more stringent environmental regulations of California.

While preferred embodiments of a training aid made according to this invention have been described in certain detail, a person of ordinary skill in the art understands that certain changes may be made in the details of construction and the arrangement of components without departing from the spirit and scope of this disclosure.

What is claimed:

1. An explosive material vapor source for use in training and as a reference, the explosive material vapor source comprising:
   a first amount of an explosive material; and
   an inorganic mesoporous non-volatile substrate including pores sized to accommodate the first amount of the explosive material, so that when loaded with the first amount of the explosive material, the explosive material vapor source is non-detonable and emits a detectable vapor at a flux that is at least equal to that of the flux of vapor emitted by the explosive material not loaded onto said substrate.

2. The explosive material vapor source according to claim 1, wherein said explosive material vapor source comprises a loading of the first amount of the explosive material of up to 25% by mass.

3. The explosive material vapor source according to claim 1, wherein said explosive material vapor source comprises no decomposition products of said explosive material.

4. The explosive material vapor source according to claim 1, wherein said inorganic mesoporous non-volatile substrate comprises a silica material or a ceramic metal oxide material.

5. The explosive material vapor source according to claim 1, wherein said inorganic mesoporous non-volatile substrate is in a form selected from the group consisting of a circular disc, a pellet, a bead, and a powder.

6. The explosive material vapor source according to claim 1, wherein said pores are in a range of 2 nm to 15 nm in diameter.

7. The explosive material vapor source according to claim 1, wherein said detectable vapor is emitted for at least 4 hours during use of said explosive material vapor source.

8. The explosive material vapor source according to claim 1, wherein said explosive material vapor source is non-detonable when exposed to a temperature at or above a thermal decomposition temperature of the explosive material, non-detonable by impact force, non-detonable by friction, or non-detonable by flame.

9. A training aid comprising:
   an inorganic mesoporous substrate material; and
   an explosive material loaded onto the surface of the pores of the inorganic mesoporous substrate material;
   wherein said explosive material is non-detonable and non-flammable and emits a detectable vapor at a flux that is at least equal to that of the flux of vapor emitted by a second greater detonable amount of the explosive material not loaded onto said substrate.

10. The training aid according to claim 9, wherein said explosive material vapor source comprises no decomposition products of said explosive material.

11. The training aid according to claim 9, wherein said detectable vapor is emitted for at least 4 hours during use of said explosive material vapor source.

12. The explosive material vapor source according to claim 1, wherein said explosive material vapor source emits a detectable vapor at a flux that is at least equal to that of the flux of vapor emitted by a second greater detonable amount of the explosive material not loaded onto said substrate.

13. A non-detonable composition comprising
   an explosive material; and
   an inorganic mesoporous non-volatile substrate into the pores of which said explosive material has been loaded, thereby rendering said explosive material non-detonable by impact force, flame, friction, or exposure to temperature above the thermal decomposition temperature of said explosive material.

14. The non-detonable composition according to claim 13, wherein said composition comprises up to 25% by mass of said explosive material.

15. The non-detonable composition according to claim 13, wherein said inorganic mesoporous non-volatile substrate comprises a silica material or a ceramic metal oxide material.

16. The non-detonable composition according to claim 13 disposed within a sealed container.

17. The non-detonable composition according to claim 16, wherein said composition emits a continuous flux of vapor of said explosive material for a period of at least 4 hours when said container is unsealed.

18. The non-detonable composition according to claim 13, wherein said explosive material is present at a first amount, said composition emits a first flux of vapor of said explosive material, and said first flux mimics a second flux of vapor emitted from a detonable second amount of said explosive material not loaded onto said substrate.

19. The training aid according to claim 1, wherein said training aid comprises up to 25% by mass of said explosive material.

20. The training aid according to claim 1, wherein said inorganic mesoporous non-volatile substrate comprises a silica material or a ceramic metal oxide material.

* * * * *